Sept. 22, 1959     W. G. STEGEMANN     2,905,163
METHOD OF AND ARRANGEMENT FOR STARTING
AN INTERNAL COMBUSTION ENGINE Filed Feb. 11, 1955     2 Sheets-Sheet 1

INVENTOR.
Werner G. Stegemann
BY
Patent Agent

Sept. 22, 1959  W. G. STEGEMANN  2,905,163
METHOD OF AND ARRANGEMENT FOR STARTING
AN INTERNAL COMBUSTION ENGINE
Filed Feb. 11, 1955  2 Sheets-Sheet 2

INVENTOR.
Werner G. Stegemann
BY
[signature]
Patent Agent

United States Patent Office 2,905,163
Patented Sept. 22, 1959

2,905,163
METHOD OF AND ARRANGEMENT FOR STARTING AN INTERNAL COMBUSTION ENGINE

Werner G. Stegemann, Pinneberg, Germany, assignor, by mesne assignments, to Rockwell Gesellschaft mit beschrankter Haftung, Pinneberg, near Hamburg, Germany Application February 11, 1955, Serial No. 487,674

Claims priority, application Germany February 16, 1954

7 Claims. (Cl. 123—179)

The present invention relates to internal combustion engines and, more particularly, to starting an internal combustion engine by preheating the combustion air of the latter by means of an auxiliary internal combustion engine.

It is an object of this invention to provide an improved method of starting an internal combustion engine by means of an auxiliary motor.

It is another object of this invention to provide an improved arrangement for starting an internal combustion engine by preheating the combustion air of the latter by means of an auxiliary motor.

These and other objects and advantages of the invention will appear more clearly from the following specification in connection with the accompanying drawings, in which:

Figs. 1, 2 and 3 respectively illustrate a front view of three modifications of a starting arrangement according to the present invention.

General arrangement

Figure 1:
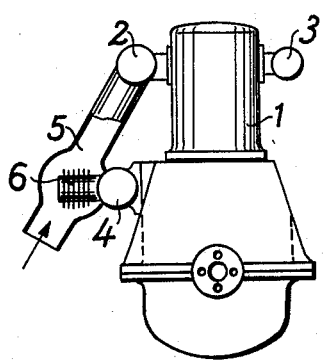

According to the present invention, the energy developed in the auxiliary motor or internal combustion engine is in the form of heat, preferably radiation heat and frictional heat, conveyed to the combustion air of the internal combustion engine to be started. This can be effected either indirectly or directly. If the direct transfer of the heat to the combustion air is desired, this may be effected by heating the combustion air by the waste heat of the auxiliary internal combustion engine. In this instance, the combustion air for the internal combustion engine to be started, which may henceforth be called the main internal combustion engine, is passed along heat releasing surfaces of the auxiliary combustion engine. The indirect heat transfer consists in that the output of the internal combustion engine is transformed into frictional heat by means of an energy converter of an air brake type which is driven by the auxiliary internal combustion engine, and the heat thus developed in said energy converter is conveyed to the combustion air passing through said energy converter. These two, direct or indirect methods, may, according to the present invention, be applied either individually or also in combination with each other. As auxiliary internal combustion engine any internal combustion engine of desired type and method of operation may be employed, preferably such an internal combustion engine the waste heat of which is passed toward the outside, in other words, such an internal combustion engine which itself produces heat adapted to be conveyed to the combustion air of the main internal combustion engine. Primarily piston engines and turbines are suitable as auxiliary internal combustion engines. Particularly advantageous is the employment of an Otto motor of a smaller output, which also at low temperatures can be started without difficulties, and can be easily and quickly brought up to full power.

According to the invention, it is further suggested that the air heated up by the auxiliary internal combustion engine be conveyed to the main internal combustion engine selectively either as combustion air or generally to warm up the said internal combustion engine by conveying the heated air to the cooling surfaces thereof. However, if desired, the air heated up by the auxiliary combustion engine may first be conveyed to the cooling surfaces of the main engine and may subsequently be conveyed to said main engine as combustion air. To this end, the feeding conduit for the heated up air may be provided with a corresponding branch conduit and the required control means. Such an arrangement will to an increased extent assure that the main engine can be started quickly and without endangering the sliding parts even at low temperatures and after a longer period of stoppage.

According to a development of the invention, it is also possible to employ the output of the auxiliary engine for cranking the main engine supplied with heated up combustion air. To this end, it is suggested to arrange a power conveying connecting between the auxiliary and the main engine, which may be selectively established or interrupted, and to arrange an energy accumulator in said connection adapted to be charged by the auxiliary engine and to release the accumulated energy for cranking the main engine.

The arrangement according to the invention may easily be applied in a simple manner and at low costs to any stationary or mobile internal combustion engine. The auxiliary internal combustion engine itself may be of rather small dimensions. The heat release by radiation which is rather high with such auxiliary engine will increase with increasing speed. Futhermore, according to the invention, the heating up process of the combustion air is made independent of electric sources, especially of accumulators, which electric sources are particularly expensive when used in connection with larger engines. Such electric sources are moreover affected in their power output by cold weather so that any additional strain of such electric sources for heating the main engine is unsuitable.

Structural arrangement

Referring to the drawings in detail and Fig. 1 thereof in particular, the arrangement shown therein comprises an internal combustion engine or main engine 1 which is provided in customary manner with an intake connection 2 and a discharge or exhaust connection 3. Connected to the intake connection 2 is a manifold 5 having a housing-like section which surrounds the cooling fins 6 of an Otto motor 4 flanged to the main engine.

In order to start the main engine 1, first the auxiliary engine 4 is started. The air within said manifold 5 is quickly heated up inasmuch as it absorbs the heat released by the auxiliary engine, which heat is considerable at full load of the auxiliary engine. Consequently, when the main engine is started, the combustion air therefor has been heated up to a great extent and thus arrives in the cylinders of the main engine in highly heated condition so that an effective mixture will be formed which facilitates the starting of the main engine. The dimensions of the auxiliary engine may be kept rather small inasmuch as its only purpose consists in heating up the combustion air for the main engine. Due to these small dimensions, the auxiliary engine can easily be connected to the main engine and requires only a small purchase price and low costs of operation.

Figure 2:
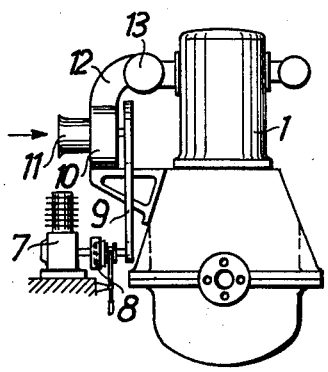

According to the embodiment of the invention as illustrated in Fig. 2, the auxiliary engine 7 drives an energy converter 10 through the intervention of a clutch 8 and a gear transmission 9. The energy converter 10 is designed similar to an air whirl brake and is so constructed and dimensioned that it is possible to transform practically the entire output of the auxiliary engine into heat. The cold outer air passing to the energy converter 10 through the intake connection 11 thereof absorbs the heat developed in the converter 10 and as preheated combustion air enters the intake conduit 13 of the main engine 1 through the connecting conduit 12.

Figure 3:
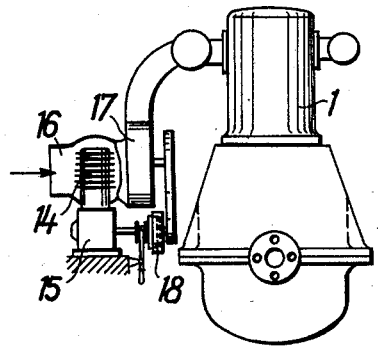

The embodiment shown in Fig. 3 differs from that of Fig. 2 inasmuch as in this instance the cooling surfaces 14 of the cylinder of the auxiliary engine 15 are located inside the intake manifold 16 of the energy converter 17, said converter 17 being driven by the auxiliary engine through a shiftable clutch 18. With this arrangement, the combustion air for the main engine 1 is heated up in two stages; namely, in the first stage by the heat released by the auxiliary engine 15, and in the second stage by the energy conversion in the energy converter 17, so that this arrangement results in a particularly favorable exploitation of the output of the auxiliary engine, and thus brings about a speeded up and effective heating up of the combustion air of the main engine.

Figure 4:
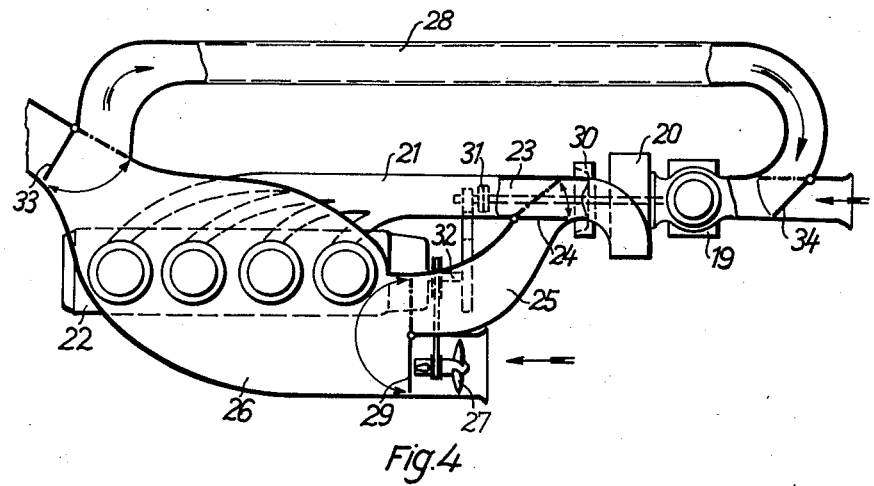
Fig. 4 is a diagrammatic top view of a further embodiment of a starting arrangement according to the present invention.
Figure 5:
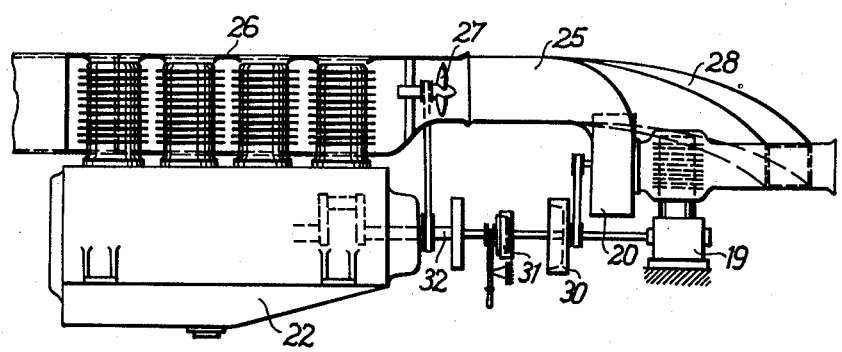
Fig. 5 represents a side view of the arrangement shown in Fig. 4.

The arrangement of Figs. 4 and 5 corresponds to that of Fig. 3 as far as the arrangement of an auxiliary engine 19 is concerned and the arrangement of an energy converter 20 driven by the engine 19 and the arrangement of a conduit 23 which is intended for conveying the preheated combustion air and which leads from the energy converter 20 to the intake manifold 21 of the main engine 22. In addition thereto, with the arrangement according to Figs. 4 and 5, the starting of the main engine 22 by means of combustion air preheated in accordance with the present invention may additionally be prepared by previously preheating the main engine by the same arrangement. To this end, the air heated up in the energy converter 20 is conveyed through a conduit 25 to a casing or cowling 26 surrounding the cylinders of the main engine. The conduit 25 branches off from the conduit 23 and is controlled by a corresponding tiltable throttle or choke 24. The cowling 26 will during the normal operation of the main engine guide the cooling air which is drawn in by a blower 27. The air which preheats the main engine may either in an open or closed circuit pass through the cowling 26. In the last instance, a return conduit 28 is provided which connects the air outlet of the cowling 26 with the intake of the energy converter 20. With this arrangement, the three throttle or choke flaps 29, 33 and 34 which control the connections of the conduits 25 and 28 occupy the position shown in heavy lines in Fig. 4, whereas said flaps occupy the position shown in dash lines in Fig. 4 when the main engine is in normal operation.

When the main engine 22, in this way has been brought up within a short time to a sufficient temperature, the flap 24 is tilted into its upper or dash line position in which it establishes communication between the converter 20 and the conduit 23 so that the air heated up in the energy converter 20 is now conveyed as combustion air to the main engine. At the same time, an energy accumulator in form of a flywheel 30, which is driven and loaded by the auxiliary engine 19, is drivingly connected with the crank shaft 32 of the main engine by throwing in the clutch 31. This energy accumulator will then, due to the energy of the auxiliary engine 19 stored in the flywheel 30, quickly crank the main engine. In this cranking operation, the auxiliary engine 19 itself has to take part only in a pushing manner; i.e., only until the main engine operates on its own power. After this only very short strong load, the auxiliary engine 19 may, by actuation of the clutch 31, again be disconnected from the main engine, and the auxiliary engine may drive the energy converter 20 only so that the main engine 22 will further receive sufficiently heated up combustion air, thereby shortening the period necessary to bring the main engine to full power.

The cranking of the main engine will reliably occur after a very short heating up period only. All operations for the starting, namely, the preheating of the main engine up to its readiness for starting, the cranking itself as well as the preceding heating up of the combustion air for the main engine are effected solely by the auxiliary engine.

In all embodiments described above, separate control members may be provided for selective connection of the intake conduit of the main engine with the outer air for the normal operation or with the heated air conduit for the starting process. These control members are preferably likewise designed as tiltable flaps. These control members, as well as the carburetor or fuel injection pump, required for the formation of the air-gas mixture are not shown in the drawings inasmuch as they represent standard equipment for such internal combustion engines.

With the arrangement according to Figs. 4 and 5, the selection of the air passages and the last-mentioned selective switching of the intake conduit for heated air or outer air may be effected more or less automatically or, for instance, by clutches in response to certain movements, or by combining a plurality of shut-off members in the manner of multi-way controls.

It may also be mentioned that the preheating of the combustion air could also be continued during the normal operation of the main engine in order to increase the ignition temperature for increasing the output of the main engine.

It is, of course, understood that the present invention is by no means limited to the particular constructions shown in the drawings but also comprises any modifications within the scope of the appended claims.

What I claim is:

1. A method of starting a main internal combustion engine by means of an auxiliary internal combustion engine having an output shaft, which includes the steps of: converting the major portion of the power output at said output shaft of said auxiliary engine into heat and conveying the same to the combustion air for said main engine to thereby supply heated up combustion air to said main engine.

2. In combination: a main internal combustion engine having an air intake manifold, and an auxiliary internal combustion engine having heat releasing outer cylinder surfaces and being arranged for selectively cranking said main engine, said air intake manifold including manifold means into which extend said heat releasing outer cylinder surfaces of said auxiliary combustion engine.

3. In combination: a main internal combustion engine having an air intake manifold including an auxiliary manifold section, an auxiliary internal combustion engine arranged for selectively cranking said main engine, an energy converter located within said auxiliary manifold section and arranged to produce frictional heat in air passing through said auxiliary manifold section to said main engine, and means drivingly connecting said energy converter with said auxiliary internal combustion engine.

4. In combination: a main internal combustion engine having an air intake manifold for conveying combustion air to said main internal combustion engine, said air intake manifold including an auxiliary manifold section, an auxiliary combustion engine arranged selectively to be drivingly connected with said main engine for cranking the same, said auxiliary engine having heat releasing outer cylinder surfaces extending into said auxiliary manifold section, and energy converter means located within said auxiliary manifold section between said auxiliary and said main internal combustion engines and adapted to produce frictional heat in air passing through said converter.

5. In combination: a main internal combustion engine having an air intake manifold for conveying combustion air to said main internal combustion engine, said air intake manifold including an auxiliary manifold section, an auxiliary combustion engine arranged for selectively cranking said main engine, said auxiliary internal combustion engine having heat releasing outer cylinder surfaces extending into said auxiliary manifold section, branch conduit means branching off from said air intake manifold at a point between said heat releasing surfaces in said auxiliary manifold section and the point of connection of said manifold with said main engine, said branch conduit means leading to surfaces of said main engine which normally serve for cooling said main engine, and control means arranged within said branch conduit means for selectively effecting or interrupting communication between said air intake manifold and said branch conduit means.

6. In combination: a main internal combustion engine having an air intake manifold including an auxiliary manifold section, and an auxiliary internal combustion engine having cooling fins and being arranged for selectively cranking said main engine, said cooling fins extending into said auxiliary manifold section.

7. In combination: a main internal combustion engine having an air intake manifold including an auxiliary manifold section, an auxiliary internal combustion engine having cooling fins, said cooling fins extending into said auxiliary manifold section, power conveying means including detachable clutch means for selectively drivingly connecting said auxiliary engine with said main engine for cranking the latter, and energy accumulating means arranged for driving connection with said auxiliary engine and to store and release mechanical energy received from said auxiliary engine to said main engine.

References Cited in the file of this patent

UNITED STATES PATENTS

| | | |
|---|---|---|
| 1,008,863 | Reuter | Nov. 14, 1911 |
| 1,176,309 | Muller | Mar. 21, 1916 |
| 1,182,531 | Dorman | May 9, 1916 |
| 1,335,990 | Short | Apr. 6, 1920 |
| 1,642,137 | Banner | Sept. 13, 1927 |
| 2,119,794 | Rosen | June 7, 1938 |
| 2,155,776 | Starr | Apr. 25, 1939 |
| 2,306,277 | Oswald | Dec. 22, 1942 |
| 2,583,882 | Ricardo | Jan. 29, 1952 |
| 2,646,028 | Russell et al. | July 21, 1953 |
| 2,748,570 | Booth | June 5, 1956 |